(12) United States Patent
Monette et al.

(10) Patent No.: US 6,581,644 B1
(45) Date of Patent: Jun. 24, 2003

(54) COMPOSITE PIPE STRUCTURE HAVING IMPROVED CONTAINMENT AND AXIAL STRENGTH

(75) Inventors: Liza Marie-Andree Monette, Whitehouse Station, NJ (US); Michael Paul Anderson, The Woodlands, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/535,119

(22) Filed: Mar. 24, 2000

Related U.S. Application Data

(63) Continuation-in-part of application No. 09/092,833, filed on Jun. 5, 1998, now abandoned, which is a continuation-in-part of application No. 08/820,511, filed on Apr. 4, 1997, now abandoned.

(51) Int. Cl.⁷ .............................................. F16L 11/00
(52) U.S. Cl. ..................... 138/174; 138/125; 138/153
(58) Field of Search ................... 138/174, 124, 138/125, 153

(56) References Cited

U.S. PATENT DOCUMENTS

| | | | |
|---|---|---|---|
| 2,747,616 A | 5/1956 | De Ganahl | 138/55 |
| 2,843,153 A | 7/1958 | Young | 138/55 |
| 3,481,369 A | 12/1969 | De Ganahl | 138/144 |
| 3,490,983 A | 1/1970 | Lee | 161/59 |
| 3,500,869 A | 3/1970 | Skoggard et al. | 138/125 |
| 3,649,338 A * | 3/1972 | Ishida | 117/97 |
| 3,661,670 A | 5/1972 | Pierpont, Jr. | 138/109 |
| 3,784,429 A | 1/1974 | Muller | 156/175 |
| 3,790,438 A | 2/1974 | Lewis et al. | 161/172 |
| 3,856,052 A | 12/1974 | Feucht | 138/119 |
| 4,010,054 A | 3/1977 | Bradt | 156/187 |
| 4,039,006 A | 8/1977 | Inoue et al. | 138/129 |
| 4,157,181 A | 6/1979 | Cecka | 138/144 |
| 4,173,670 A | 11/1979 | Van Auken | 138/141 |
| 4,214,932 A | 7/1980 | Van Auken | 156/187 |
| 4,385,644 A | 5/1983 | Kaempen | 138/109 |

(List continued on next page.)

FOREIGN PATENT DOCUMENTS

| | | |
|---|---|---|
| EP | 0404670 A1 | 12/1990 |
| EP | 0475412 A2 | 3/1992 |
| EP | 0475412 A3 | 3/1992 |
| FR | 0404670 | 12/1990 |
| GB | 2010446 A | 6/1979 |
| GB | 2010446 | 6/1979 |
| WO | WO 99/62704 | 12/1999 |

OTHER PUBLICATIONS

"Encyclopedia of Polymer Science and Engineering, vol. 2, Anionic Polymerization to Cationic Polymerization"; John Wiley & Sons, Inc., New York; 1985; pp. 641–642.

"Encyclopedia of Polymer Science and Engineering, vol. 3, Cellular Materials to Composites"; John Wiley & Sons, Inc., New York; 1985; pp. 796–798.

*Primary Examiner*—James Hook
(74) *Attorney, Agent, or Firm*—Estelle C. Bakun; Charles J. Brulik

(57) ABSTRACT

Composite laminated fiber reinforced plastic pipe having improved resistance to micro-cracking and delamination is disclosed. The pipe is composed of a plurality of laminated layers forming the pipe wall structure, including an outer axial bearing layer containing reinforcing continuous fibers embedded in a thermoset resin binder and disposed at a substantially fixed angle of 0° up to +/−30° with respect to the longitudinal pipe axis and an inner layer in contact with the inner surface of the outer layer and containing reinforcing continuous fibers embedded in a thermoset resin binder and disposed at a substantially fixed angle of greater than +/−30° with respect to the longitudinal pipe axis.

16 Claims, 4 Drawing Sheets

U.S. PATENT DOCUMENTS

| | | | |
|---|---|---|---|
| 4,431,034 A | 2/1984 | Ardullaev et al. | 138/132 |
| 4,657,049 A | 4/1987 | Fourty et al. | 138/133 |
| 4,728,224 A | 3/1988 | Salama et al. | 405/195 |
| 5,091,230 A | 2/1992 | Fuchs et al. | 428/36.4 |
| 5,191,486 A | 3/1993 | Sato et al. | 359/894 |
| 5,236,018 A | 11/1993 | Kobayashi et al. | 138/172 |
| 5,330,807 A | 7/1994 | Williams | 428/34.5 |
| 5,439,323 A | 8/1995 | Nance | 405/195.1 |
| 5,512,119 A * | 4/1996 | Takezawa et al. | 156/171 |
| 5,749,985 A | 5/1998 | Sparks et al. | 156/64 |
| 6,240,971 B1 * | 6/2001 | Monette et al. | 138/153 |

* cited by examiner

COMPOSITE PIPE STRUCTURE HAVING IMPROVED CONTAINMENT AND AXIAL STRENGTH

This appl. is a CIP of U.S. Ser. No. 09/092,833 filed Jun. 5, 1998 now abandoned which is a Continuation-in-part of U.S. Ser. No. 08/820,511 now abandoned filed Apr. 4, 1997.

BACKGROUND OF THE INVENTION

1. Field of the Invention

The invention relates to pipes and tubing having a wall structure composed of fiber reinforced polymer composite laminates.

2. Description of Related Art

Fiber reinforced plastic pipe (FRP pipe) is finding increased usage as piping in chemical plants as well as casing used in the drilling of oil and gas wells and casing and tubing for the transport of crude oil and natural gas up from the well source.

The advantage of FRP pipe over carbon steel pipe in oil/gas applications includes superior corrosion resistance, flexibility in achieving mechanical property design targets and improved fatigue resistance. FRP pipes are also of considerably lighter weight for a given wall thickness than their steel pipe counterparts.

FRP pipe designed for use in high pressure piping or casing such as crude oil pipelines and oil well tubing are generally prepared by impregnating a roving of filaments of a high strength material, such as continuous glass filaments, with a thermoset table resin composition, such as an epoxy resin, and winding the impregnated filaments back and forth onto a mandrel under tension to form a plurality of inter meshed filament windings. Filaments may be wound at an angle of 90° to the pipe axis or at angles of 0° to plus and minus about 90° (+/−90°) with respect to the pipe axis. A helical filament winding pattern is formed when the winding angle is between 0° and 90° with respect to the longitudinal pipe axis. After a desired pipe wall thickness is achieved, the winding operation is discontinued, the resin is cured and the mandrel is extracted resulting in a cylindrical pipe having a fiber reinforced wall structure. FRP pipes of this type and their method of production are disclosed, e.g., in U.S. Pat. Nos. 2,843,153 and 5,330,807, the complete disclosures of which patents are incorporated herein by reference.

FRP pipe designed for use in onshore or offshore fossil fuel recovery must be constructed to withstand two basic forces to which it will be subjected. The first force is an outer radial load exerted along a vector normal to the pipe walls by fluids (oil or drilling muds) which are conveyed. under moderate to high pressure through the pipe, also known as the hoop load. The second force is an axial tensile load exerted along vectors parallel to the pipe axis and occasioned by the fluid pressure and/or the weight of a long string of coupled pipe sections suspended in the ground at the well bore and/or between the well bore and surface platform in offshore recovery operations. These strings are often suspended 3,000 to 10,000 feet (about 850 to 2800 meters), and thus must be able to carry a long term axial stress in excess of about 2500 pounds per square inch (or 2.5 ksi) occasioned during operation and when the pipe string is inserted and removed during the fossil fuel recovery process.

FRP pipe having maximum hoop strength can be designed if the reinforcing fiber is wound at an angle close to 90° to the pipe axis, e.g., +/−70° up to 90°. Conversely, maximum tensile strength is developed where the reinforcing fiber is applied at an angle close to 0° to the pipe axis, e.g. +/−30° down to 0°. However, pipe wound at or close to 90° exhibits severe diminishment of axial tensile strength while pipe wound at or close to 0° exhibits severe diminishment of hoop strength. Pipe wound at intermediate pipe axis angles between +/−30° to +/−70° (as disclosed in U.S. Pat. No. 2,843,153) generally compromises hoop and particularly axial strength and may be insufficiently strong for practical use in many fossil fuel recovery operations.

One technique for attempting to maximize both hoop and axial strength is to lay down the reinforcing fiber composite as separate laminate layers one atop another, each layer having the fibers disposed at different pipe axial angles designed to maximize the hoop or axial stress bearing properties of the pipe as well as minimize the coefficient of expansion of the composite pipe. An example of such a construction containing +/−20° to +/−60° fiber layers alternating with 90° layers is disclosed in U.S. Pat. No. 5,330,807. Other similar layered laminates are disclosed in U.S. Pat. Nos. 4,728,224 and 4,385,644.

Laminates of this type comprising a plurality, e.g., 3 to 9, separate layers are generally designed for an optimization of hoop or axial stiffness and therefore do not take advantage of the anisotropy of unidirectional fiber composites. For instance, alternating a 0 and +/−70 degree lay-up does not take advantage of the maximum hoop strength of the +/−70 degree layer or the maximum axial strength of the 0 degree layer.

Also, composite laminates currently commercially available exhibit a serious deficiency which makes their use not cost effective in applications that generate even moderate pipe stress levels. Microcracking and delamination of the pipe wall structure at or near the pipe joints and/or along the pipe length provide a leak path for fluids, commonly referred to as "weeping", which can occur at fluid pressures which can be 5 to 10 times less than the pipe short-term burst pressure. Intrusion of water into the pipe wall structure via these micro cracks can attack glass fiber surfaces and/or binder resin, leading to delamination and premature pipe failure.

Although microcracking can be mitigated by increasing the pipe wall thickness, this solution drives the composite pipe and tubing cost up as compared to that of carbon steel. The higher cost constitutes a barrier to the substitution of composite pipes and tubing for carbon steel in moderate to high (injection) pressure applications. Also, in down hole applications, the increased wall thickness prevents the use of composites where the diameter of the well bore is constrained, because of the cross-sectional area available for fluids to flow is smaller than that of carbon steel. The use of composites in these applications would require drill holes with larger diameter, and this gives rise to additional drilling costs.

The axial strength of composite pipe cannot be significantly increased by increasing the wall thickness. This limits composite down hole tubing, casing, and injection tubing to wells whose depth does not exceed about 5000 ft.

Accordingly, it is a primary object of this invention to provide layered composite FRP piping having acceptable hoop and axial strength which is more resistant to microcracking and delamination on the one hand and also has diminished wall thickness on the other hand such that the piping is compatible with carbon steel well bore/casing dimensions.

SUMMARY OF THE INVENTION

The present invention provides a fiber reinforced plastic pipe having a hollow tubular body with a wall structure formed from a plurality of layers, each layer containing fibers that may be the same for each layer or different, the fibers being fixed in a resin binder and oriented at a substantially fixed angle with respect to the longitudinal axis of the pipe, comprising: an outer axial load-bearing layer containing a plurality of first fibers, the first fibers ranging in thickness (diameter) from about 1 to less than 14 μm and disposed at a substantially fixed angle ranging from 0° to about +/−30°, and a second layer in fixed contact with the outer layer disposed radially inward of the outer layer, the second layer containing a plurality of second fibers disposed at a substantially fixed angle of greater than +/−30°, the second fibers ranging in thickness (diameter) from about 1 μm to about 24 μm.

The pipe is designed so that when male threaded joint sections are molded or cut at the outer wall surface of one or both ends of the pipe, the molded/cut threads extend into/onto the axial load bearing layer of the pipe such that this layer carries substantially all of the axial stress generated during the mechanics of fossil fuel recovery. This reduces the shear stress and axial strain mismatch between the axial load bearing layer and adjacent layer(s) which are designed to maximize the hoop strength of the pipe.

As used herein, substantially fixed means that the angle will only vary by the amount of accuracy in the filament winding equipment when a fixed angle is chosen. Typically, no more than plus or minus 5 degrees, preferably no more than plus or minus 2 degrees, and more preferably no more than plus or minus 1 degree of variation will be present. One skilled in the art recognizes that the lower the variation, the better. However, it is also recognized that slight variations are, in most cases, unavoidable.

DETAILED DESCRIPTION OF THE INVENTION

Figure 1:
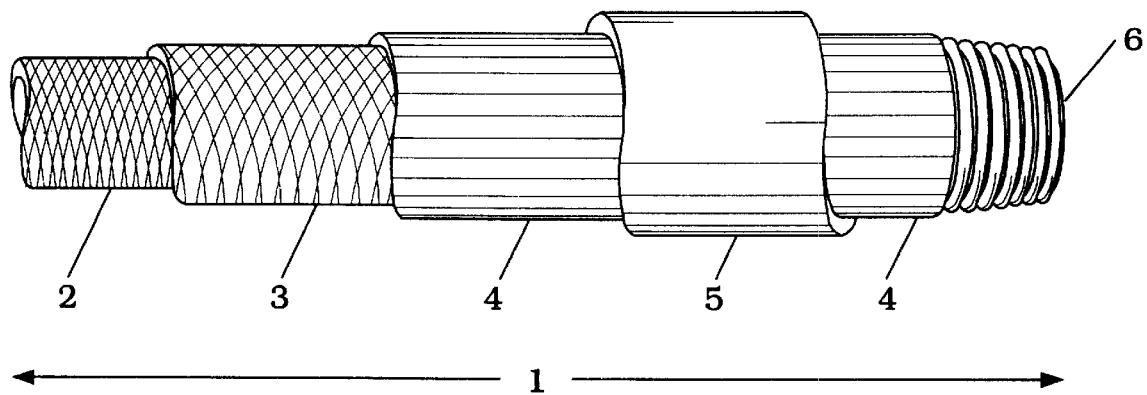
FIG. 1 is an elevation view in partial section of the composite pipe element of this invention.

Referring to the drawings, FIG. 1 shows an elevational view in partial section of a male threaded end section of pipe constructed in accordance with an embodiment of this invention. As shown, the pipe consists of an elongated hollow tubular body 1 constructed of three laminated fiber reinforced polymer layers shown at 2, 3 and 4 respectively and an optional fourth protective or wrapping layer shown at 5. The end section of the pipe shown at 6 comprises a male threaded tapered joint section cut or molded into outer reinforced layer 4. Reinforcing fibers shown forming helical patterns at 2 and 3 and a horizontal pattern at 4 are drawn to illustrate fiber winding patterns and are not drawn to scale to show fiber winding density. Fibers, also referred to herein as filaments, may be bundled, wound, or otherwise twisted together prior to pipe fabrication.

Layer 4 of FIG. 1 is the axial load bearing layer of the pipe and is designed to bear substantially all of the axial load exerted on the pipe when a number of pipe segments are coupled to form a string and the string is disposed either horizontally (i.e., above or below ground) or vertically (i.e., under water and/or into well bores). Axial load is transmitted along layer 4 through female threaded connectors or couplers (not shown) which are adapted to mate with two pipe ends which are to be joined during the construction of a pipe string. The taper and cut of male threaded joint section 6 extends into axial load bearing layer 4, preferably to a degree short of reaching underlying layer 3.

The fibers present in binder layer 4 range in thickness from about 1 μm to less than 14 μm and are disposed at an angle with respect to the longitudinal pipe axis designed to maximize the axial tensile load bearing properties of this layer, e.g., at an angle ranging from 0° up to +/−30°, more preferably up to about +/−15° and most preferably at about 0°. Fibers at 4 in FIG. 1 are shown disposed at a 0° angle with respect to the pipe axis, but it is understood that this angle may vary up to and including +/−30°. Preferred fiber thickness for this layer range from about 1 μm to about 10 μm, with 7 μm being particularly preferred.

Layer 3 shown in FIG. 1 is a hoop load bearing layer of the pipe and comprises a second layer in fixed contact with layer 4 and is disposed radially inward of layer 4. The reinforcing fibers present in layer 3 are disposed at an angle of greater than +/−30° with respect to the longitudinal pipe axis, more preferably greater than +/−40° and up to 90° with respect to the pipe axis. Where layer 3 is the sole hoop load bearing layer, the fibers are preferably disposed at an angle of at least +/−55°, more preferably about +/−70°, with respect to the pipe axis. Layer 3's reinforcing fibers range in thickness from about 1 μm to about 24 μm, preferably from about 10 μm to about 16 μm.

Layer 3 shown in FIG. 1 may be the sole hoop load bearing layer or hoop stress may be further accommodated by one or more optional additional layers such as layer 2, which is disposed radially inward of layer 3 and in fixed contact therewith. Layer 2 contains reinforcing fibers disposed preferably at an angle greater than the angle of disposition of the fibers in layer 3 and up to an angle of 90° with respect to the longitudinal pipe axis. Most preferably the fibers in layer 2 are disposed at an angle of at least +/−60° with respect to the pipe axis. The fibers of each hoop stress layer may be the same or different and range in thickness from about 1 μm to about 24 μm, preferably about 10 μm to about 16 μm.

In a preferred embodiment of the invention where the pipe comprises three composite reinforcing layers, the fibers in layer 4 are disposed at a substantially fixed angle of about 0°, the fibers in layer 3 are disposed at a substantially fixed angle of +/−40° to +/−60° and preferably about +/−55°, and the fibers in layer 2 are disposed at a substantially fixed angle of greater than +/−60°, preferably about +/−70°, each with respect to the longitudinal pipe axis.

Layer 5 shown in FIG. 1 is an optional layer which may be applied as a protective layer or as a fiber reinforced winding layer to insure that the fibers in layer 4 are tightly bound in the resin binder. Layer 5 is not designed as an axial load bearing layer and is cut away at the pipe ends prior to forming the tapered male threaded joint section 6.

Composite laminate pipes of this invention are made by the well known wet filament winding process such as disclosed in the aforementioned U.S. Pat. No. 2,843,153. By this method, a bundle of continuous reinforcing filaments is impregnated with a fluid resin material, preferably an uncured thermosetting resin, and fed under tension through a shuttle which traverses back and forth over a rotating mandrel. Alternatively, the rotating mandrel itself may traverse back and forth and the shuttle may be in a fixed position. Each layer thereby produced is substantially uniform throughout its length. Substantially uniform as used herein means the layer only varies by the amount of variation of the angle producing the layer. Preferably, the layer will be uniform throughout its length.

The impregnated fiber bundles are built up along the mandrel in close proximity or abutting one another and form criss cross (helical) patterns as they are built up one layer atop another until the desired layer thickness is achieved. The angle of disposition of the fibers with respect to the mandrel longitudinal axis may be largely controlled as a function of the lateral speed of the shuttle as it traverses the mandrel. After the desired thickness of the initial layer is achieved (layer 2 in FIG. 1), the process is adjusted to lay down a second layer of resin impregnated fibers at an angle different than that of layer 2 (layer 3 in FIG. 1), and so on. Axial load bearing layer 4 may also be applied using the filament winding technique except where the fibers are disposed at an angle of 0° with respect to the mandrel axis. In this latter case, the axial load bearing layer of desired thickness is applied as a resin saturated pre peg tape or sleeve which can be laid up by hand. Alternatively, the longitudinal lay down method may be used where 0° fibers are laid on the mandrel atop layer 3 while being captured by a 90° outer wrap, such as illustrated at 5 in FIG. 1.

The resinous material which serves as a binder for the reinforcing fibers is preferably a thermoset resin such as an epoxy. The preferred epoxy resins for carrying out the invention include bisphenol—A diglycidyl ester, bisphenol glycidyl ether, novolac resin glycidyl ether and aliphatic polyepoxide, though other suitable epoxy resins may be used. Aside from epoxy resins, other suitable thermosetting polymers include phenolic resins, unsaturated polyesters and polyimides. The degree of condensation of these resins is selected so that the viscosity of the resin product is adapted to the working conditions necessary for formation of the tubular body. The thermosetting polymers are mixed with suitable hardeners, such as aromatic polyamines, polyamides, aliphatic polyamines, polyacids, polyanhydrides, dicyandiamides, primary or secondary amines, mixtures of these, or any other of the hardeners typically used as cross linking agents for thermosetting resins.

The quantity of resin applied to the fibers in forming the tubular pipe body should be sufficient such that the volume fraction of fiber present in the cured product is at least about 40%, more preferably in the range of about 50 to 70%, still more preferably about 55 to 65%, with the balance being the epoxy resin composition.

The reinforcing fibers, filaments, fiber bundles, or filament bundles may comprise continuous filaments of glass, graphite, aramide or Kevlar® fiber, or a combination thereof, which exhibit extremely high tensile strength. Filaments useful in axial load bearing layers range in thickness (diameter) from about 1 $\mu$m to less than 14 $\mu$m, with about 1 $\mu$m to about 10 $\mu$m being preferred, and 7 $\mu$m being particularly preferred. Filaments useful in hoop load bearing layers range in thickness from about 1 $\mu$m to about 24 $\mu$m, with about 10 $\mu$m to about 16 $\mu$m being preferred. Glass fibers are preferably coated with materials such as aminopolysiloxane, which enhances the wettability and adhesion of the fiber's surface with respect to the resin binder.

After the resin-wetted composite pipe is assembled on the mandrel, the resin is cured by heating the structure to a temperature sufficient to cure the resin, e.g., 100°–170° C., for a period of time ranging from about 30 minutes up to 12 hours, after which the assembly is removed from the mandrel.

Referring back to FIG. 1, the relative thickness of the axial load bearing layer 4 should be sufficient to carry the anticipated long service axial load on the pipe, (e.g., at least 20 ksi). As a general rule, the axial load bearing layer will comprise 50% or less of the pipe wall thickness, most preferably from about 20 up to 50% of the pipe wall thickness.

The balance of the pipe wall comprises hoop load bearing layer 3 or layers 3 and 2. The hoop load bearing layer(s) are capable of bearing long term hoop stress in excess of about 15 ksi and are preferably configured such that these layers are also capable of bearing a minimal axial stress of about 4 ksi.

FRP pipe made in accordance with this invention may have outside diameters in the range of about 2 to 36 inches, and are normally used for oil/gas production and transmission. Pipes used for down hole applications fall into two categories: tubing, with an outside diameter of 4.5 inches (nominal) and less; and casing, with an outside diameter greater than 4.5 inches (nominal).

As stated above, FRP pipe constructed in accordance with this invention provide a built-in modality for handling the axial stress and hoop stress forces separately along the pipe wall cross section. This allows for a reduction in pipe wall thickness while at the same time achieving an increase in both hoop strength and axial strength of up to 100%.

Figure 2:
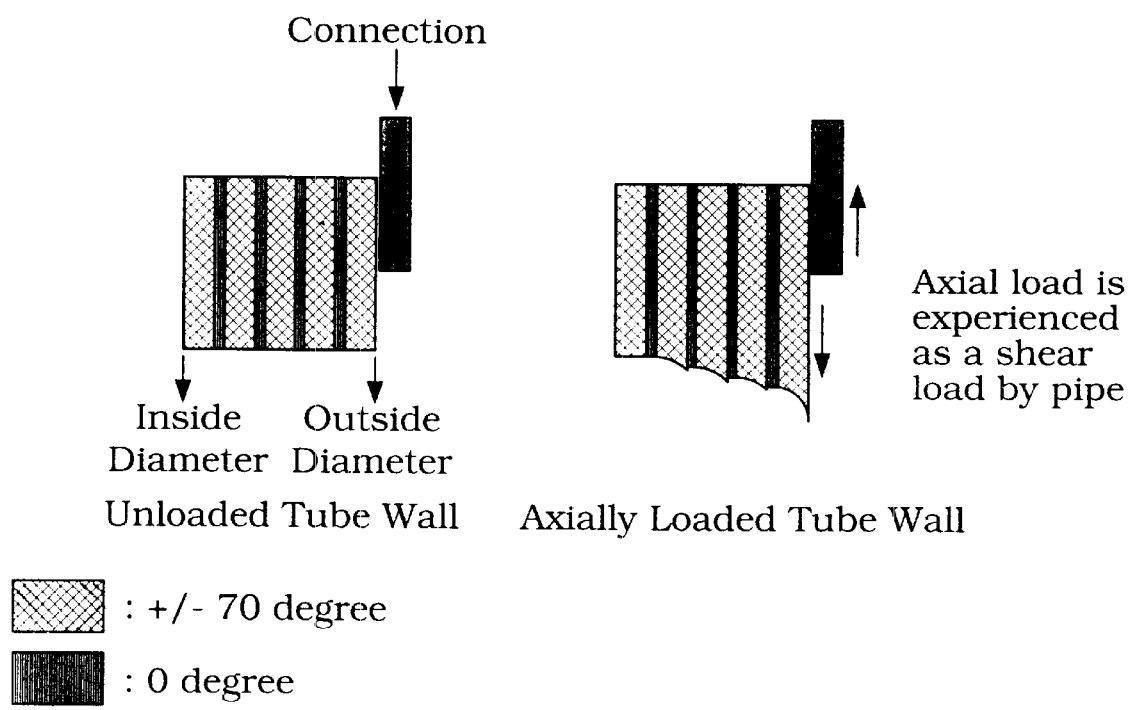
FIGS. 2 and 3 are schematic cross sectional views of the wall section of two different commercial composite pipes having a plurality of layers having alternating fiber orientations.

For example, FIG. 2 shows in cross section a commercially available tubing, 2,000 psig rated, having an outside radius of 1.37 inch and an inside radius of 0.97 inch and a wall thickness of 0.4 inch. The wall consists from inside to outside of five alternating layers containing +/−70° wound fiberglass fibers surrounding four thinner alternating layers containing 0° disposed fiberglass fibers.

Figure 4:
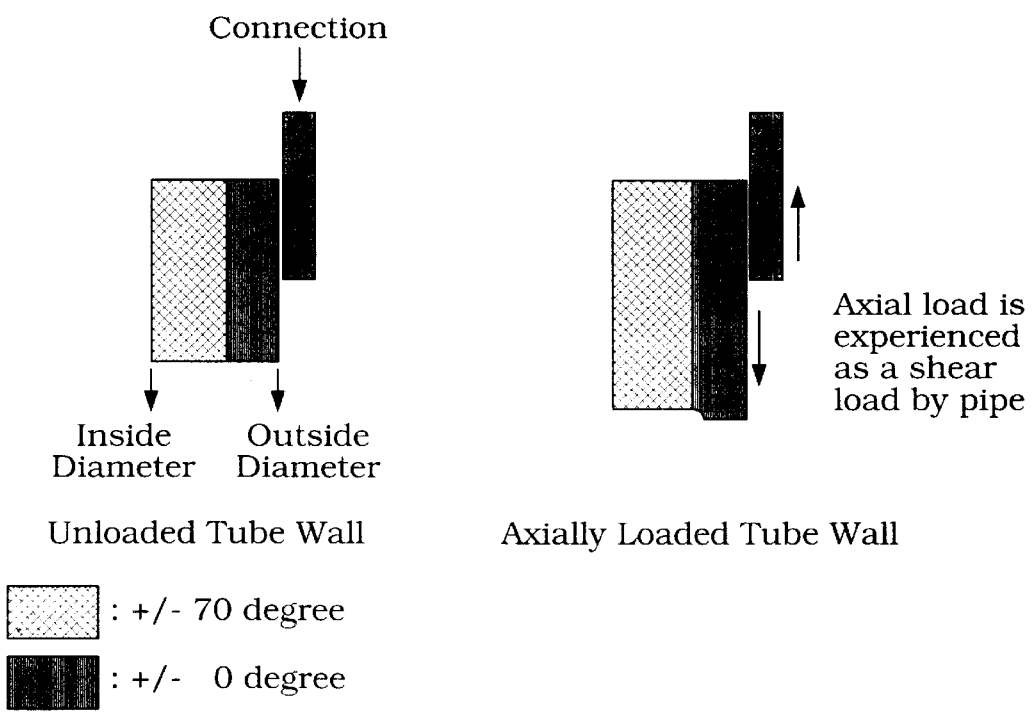
FIG. 4 is a schematic cross sectional view of the wall section of a two layer composite pipe wherein the fiber orientations in each layer are in accordance with this invention.

FIG. 4 shows a cross section of a similar pipe made in accordance with this invention, but having a wall thickness of only 0.25 inch and containing, from inside to outside a single +/−70° would fiberglass layer having a thickness of 0.15 inch and single axial load bearing layer containing 0° disposed fiberglass fibers having a layer thickness of 0.10 inch. The fiber volume fraction in each case is about 60% in each layer.

Comparative tensile and hoop stress evaluation of each pipe configuration demonstrates that the configuration in FIG. 4 provides about a 60% increase in hoop strength and about a 70% increase in axial strength as compared with the commercial design of FIG. 2. This means that the tubing is not only 60–70% more cost effective but also that it can reach depths about 60–70% of greater than the 5000 foot depth achieved by current commercial tubing.

Yet another advantage afforded by piping configured in accordance with this invention is a reduction in axial strain mismatch between the various layers because the primary layer bearing the axial stress is a single outside layer. Axial load is experienced as a shear load across the cross section of the pipe wall, resulting in an axial strain (deformation). Axial strain throughout the cross section of the pipe wall can lead to delamination and microcracking of the pipe wall over a period of time resulting in the phenomenon known as weeping and premature pipe failure.

Figure 3:
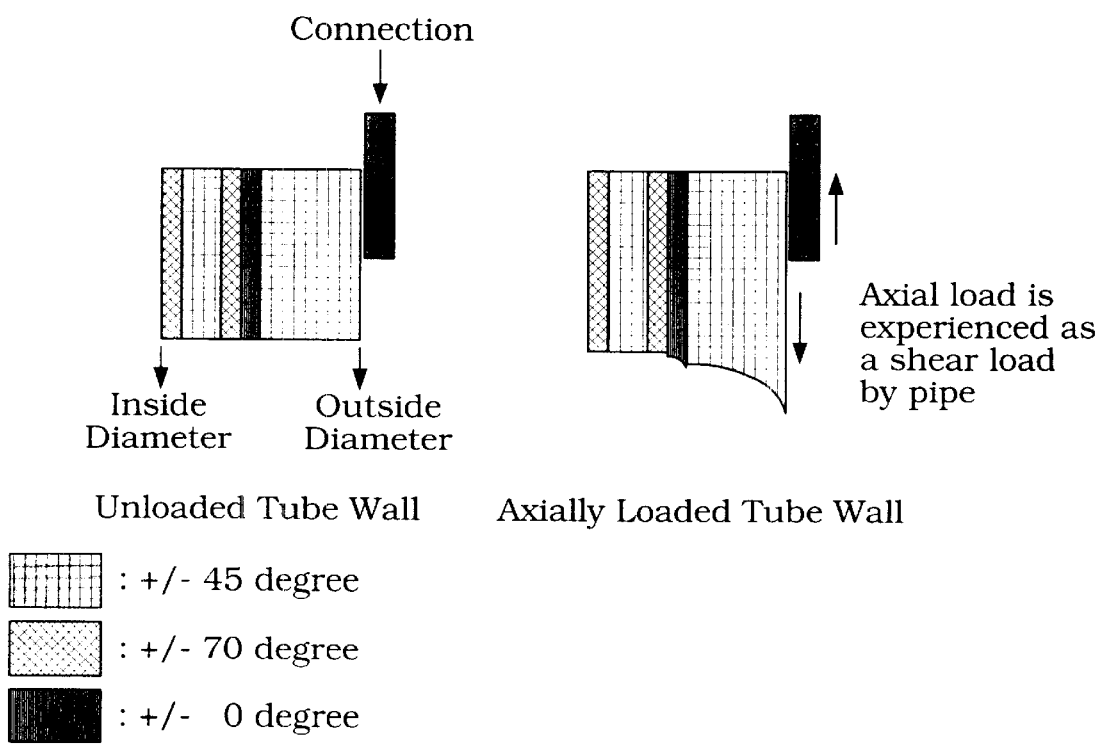

Axial strain mismatch for two commercial multilayer pipe configurations is illustrated in FIGS. 2 and 3, and axial load on the pipe, applied through the pipe connections (shown schematically), is also illustrated. The Figures clearly demonstrate the strain on the outside layers bearing the direct tensile load and additional strain at interfaces of the various layers.

FIG. 4 demonstrates the reduction in axial strain mismatch afforded by the pipe design of this invention wherein substantially all of the axial load is supported by the 0° outside layer.

The invention is further described in the following non-limiting examples.

EXAMPLE 1

Hoop stress and axial stress calculations were performed for composite pipes formed according to methods known in the art. The calculations are based on a fiber reinforced pipe having an outer layer formed from commercial 14 μm diameter fibers disposed at a 0° angle in a resinous binder, the fiber volume fraction in the layer being approximately 60%. The outer layer is in contact with an inner layer formed from the same fiber as the outer layer, the inner layer's fibers being present in a 60% volume fraction in a resinous binder and wound at +/−70° angle.

Such a pipe, when used in long term (10–30 years) oil production service, will be exposed to average external pressures of about 2,000 psi and average tensile loads of 21,000 Lb. Accordingly, the outer layer of such a pipe must withstand hoop stresses of 2.6 ksi and average axial stresses of about 21.8 ksi. The inner layer must withstand hoop stresses of 15 ksi and average axial stresses of 4.9 ksi.

Calculations, the results of which are set forth in Table 1, show that the 0° layer formed from conventional 14 μm diameter fiber is not sufficiently strong to survive long-term use.

TABLE 1

| | Required Hoop Stress (ksi) | Actual Hoop Stress (ksi) | Required Axial Stress (ksi) | Actual Axial Stress (ksi) |
| --- | --- | --- | --- | --- |
| Outer layer | 2.6 | 2 | 21.8 | >60 |
| Inner layer | 15 | 20 | 4.9 | 5 |

The table shows that the long term calculated hoop strength of 2 ksi for the 0° layer is insufficient to meet the 2.6 ksi hoop strength requirement during use. Increasing hoop strength by increasing the fiber volume fraction is not practical because higher volume fractions result in undesirably large void content. Additionally, increasing hoop strength by increasing the total amount of fiber, and thereby increasing the total thickness of the outer layer, is not practical because the additional fiber results in higher material costs, and the additional thickness results in higher fabrication, transportation, and installation costs.

EXAMPLE 2

Hoop stress and axial stress calculations were also performed for the composite pipes of this invention. As in Example 1, an outer 0° fiber layer was in contact with an inner +/−70° fiber contact, both layers having a resinous binder and a fiber binder fraction of 60%. However, in accordance with this invention, the fibers of the outer fiber layer were 7 μm in diameter. Results of the strength calculations are set forth in Table 2.

TABLE 2

| | Required Hoop Stress (ksi) | Actual Hoop Stress (ksi) | Required Axial Stress (ksi) | Actual Axial Stress (ksi) |
| --- | --- | --- | --- | --- |
| Outer layer | 2.6 | 2.8 | 21.8 | >60 |

Comparing Tables 1 and 2 reveals that pipes using 7 μm fiber in the 0° layer have hoop strengths 40% greater than such pipes using 14 μm fiber in the 0° layer.

What is claimed is:

1. A fiber reinforced plastic pipe comprising an elongated, hollow tubular body, concentric with a longitudinal axis, with a wall structure formed from a plurality of layers, at least two of such layers containing fibers fixed in a resin binder, the fibers being disposed at a substantially fixed angle with respect to the longitudinal axis of the pipe, wherein the layers containing fibers consist essentially of an outer axial load bearing layer and one or two inner hoop load bearing layers, the outer layer containing first fibers ranging in thickness from about 1 to about 7 μm and disposed at a substantially fixed angle ranging from 0° to about +/−30°, and the inner layer or layers disposed radially inward of the outer layer containing second fibers disposed at a substantially fixed angle of greater than +/−30°, and ranging in thickness from about 10 μm to about 24 μm.

2. The pipe of claim 1 wherein the first fibers are disposed at an angle of less than about +/−15° with respect to said longitudinal pipe axis, and range in thickness from about 1 μm to about 10 μpm.

3. The pipe of claim 1 wherein the first fibers are disposed at an angle of about 0° with respect to said longitudinal pipe axis, and have a thickness of 7 μm.

4. The pipe of claim 3 wherein the second fibers are disposed at an angle of about +/−50 to +/−75° with respect to said longitudinal pipe axis.

5. The pipe of claim 1 wherein said second axial layer comprises 50% or less of said pipe wall thickness.

6. The pipe of claim 1 wherein the second fibers are disposed at an angle of greater than about +/−40° up to 90° with respect to said longitudinal pipe axis, and have a thickness ranging from about 10 μm to about 16 μm.

7. The pipe of claim 6 wherein the second fibers are disposed at an angle of greater than about +/−55° with respect to said longitudinal pipe axis.

8. The pipe of claim 1 further comprising a third layer disposed radially inward of and in fixed contact with said second layer and containing third fibers disposed at an angle greater than the angle of disposition of said second fibers and up to an angle of 90°, the third fibers ranging in thickness from about 1 to about 24 μm.

9. The pipe of claim 8 wherein the second fibers are disposed at an angle of greater than about +/−40° up to about +/−60° with respect to said longitudinal pipe axis and the third fibers are disposed at an angle of greater than about +/−60° up to 90° with respect to said longitudinal pipe axis.

10. The pipe of claim 8 wherein the first fibers have a thickness of 7 μm and are disposed at an angle of about 0°, the second fibers range in thickness from about 10 μm to about 16 μm and are disposed at an angle of +/−40° to +/−60°, and the third fibers range in thickness from about 10 μm to about 16 μm and are disposed at an angle of greater than +/−60° up to 90°, each with respect to said longitudinal pipe axis.

11. The pipe of claim 10 wherein the second fibers are disposed at an angle of about +/−55° and the third fibers are disposed at an angle of about +/−70°, each with respect to said longitudinal pipe axis.

12. The pipe of claim 1 wherein said resin binder is a thermoset resin.

13. The pipe of claim 1 wherein said thermoset resin is an epoxy resin.

14. The pipe of claim 1 wherein the first and second fibers are glass fibers.

15. The pipe of claim 1 wherein said first and second fibers comprise at least about 60% of the volume fraction of said pipe wall.

16. The pipe of claim 1 containing a male threaded joint section cut or molded at the outer wall surface of one or both ends of said pipe, said thread cuts extending into the axial load bearing layer of said pipe.

* * * * *